(12) United States Patent
Tawaraya et al.

(10) Patent No.: US 7,796,236 B2
(45) Date of Patent: Sep. 14, 2010

(54) SUBSTRATE FOR LIQUID CRYSTAL DISPLAY

(75) Inventors: Seiji Tawaraya, Tokyo (JP); Tomonobu Sumino, Tokyo (JP); Shinji Hayashi, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 12/249,015

(22) Filed: Oct. 10, 2008

(65) Prior Publication Data

US 2009/0033860 A1    Feb. 5, 2009

Related U.S. Application Data

(63) Continuation of application No. 10/551,276, filed as application No. PCT/JP2004/003538 on Mar. 17, 2004, now Pat. No. 7,453,546.

(30) Foreign Application Priority Data

Mar. 28, 2003    (JP)    ............................. 2003-092236

(51) Int. Cl.
*G02F 1/1339*    (2006.01)
*G02F 1/1341*    (2006.01)

(52) U.S. Cl. ........................ 349/187; 349/156; 349/189; 349/190

(58) Field of Classification Search ................. 349/155, 349/156, 157, 158, 187, 188, 189, 190; 445/24, 445/25
See application file for complete search history.

(56) References Cited

U.S. PATENT DOCUMENTS

| 5,978,061 | A * | 11/1999 | Miyazaki et al. | 349/155 |
|---|---|---|---|---|
| 6,275,280 | B1 * | 8/2001 | Kajita et al. | 349/155 |
| 6,597,425 | B2 * | 7/2003 | Kadota et al. | 349/156 |
| 7,199,855 | B2 * | 4/2007 | Yoshimi et al. | 349/187 |
| 7,362,409 | B2 * | 4/2008 | Tamatani et al. | 349/189 |
| 2002/0060771 | A1 * | 5/2002 | Sumino et al. | 349/156 |
| 2003/0071959 | A1 * | 4/2003 | Koyama | 349/156 |
| 2004/0001177 | A1 * | 1/2004 | Byun et al. | 349/187 |

FOREIGN PATENT DOCUMENTS

| JP | 2001-013506 A | 1/2001 |
|---|---|---|
| JP | 2001-142076 A | 5/2001 |

* cited by examiner

*Primary Examiner*—Dung T Nguyen
*Assistant Examiner*—Tai Duong
(74) *Attorney, Agent, or Firm*—Ladas & Parry LLP (57) ABSTRACT

A substrate for a liquid crystal display that includes at least a transparent substrate and a columnar spacer formed on the transparent substrate. The amount of initial deformation A of the spacer measured by a predetermined measurement method is 0.04 μm or more and the amount of plastic deformation B is 0.7 μm or less.

8 Claims, 3 Drawing Sheets

SUBSTRATE FOR LIQUID CRYSTAL DISPLAY

TECHNICAL FIELD

The present invention relates to a substrate for a liquid crystal display that can maintain a uniform cell gap, and to a liquid crystal display using this substrate for a liquid crystal display and having an excellent display quality.

BACKGROUND ART

Liquid crystal displays perform display by making a displaying side substrate and a liquid crystal driving side substrate face to each other, enclosing a liquid crystal compound between the two to form a thin liquid crystal layer, and electrically controlling the liquid crystal alignment within the liquid crystal layer with the liquid crystal driving side substrate to change the amount of transmitted light or reflected light of the displaying side substrate selectively.

Such a liquid crystal display includes various driving methods such as the static driving method, the passive matrix, and the active matrix. In recent years, a color liquid crystal display using a liquid crystal panel of the active matrix or the passive matrix is rapidly getting in prevalence as a flat display for such as a personal computer or a portable information terminal.

Figure 3:
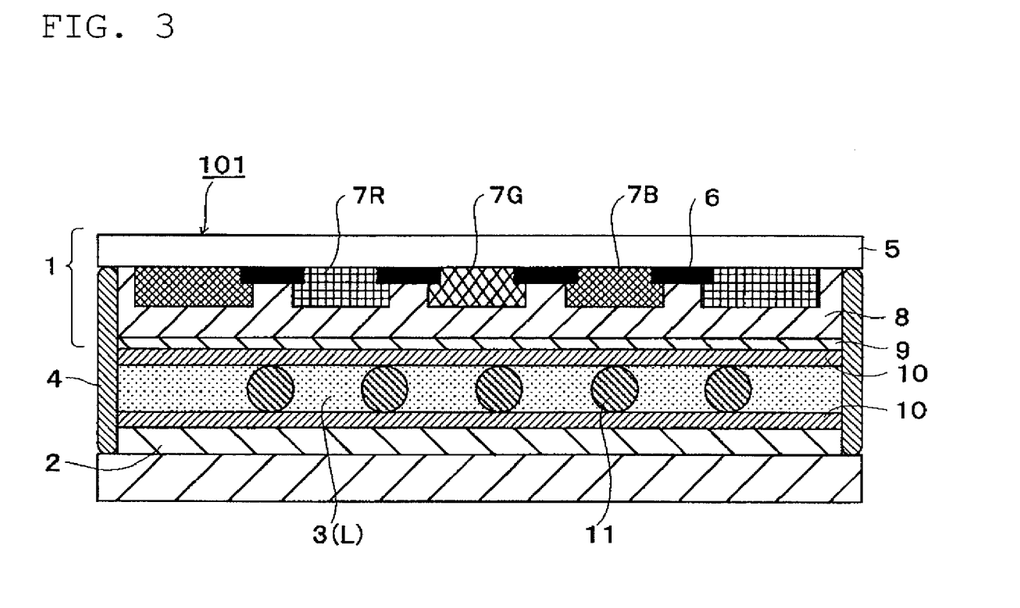
FIG. 3 is a schematic cross-sectional view showing one example of a conventional liquid crystal display.

FIG. 3 is one example of a liquid crystal display panel of the active matrix. A liquid crystal display 101 assumes the structure of being a color filter 1 serving as a displaying side substrate and a TFT array substrate 2 serving as a liquid crystal driving side substrate facing each other with a gap portion 3 of about 1 to 10 μm in between, and this gap portion 3 is filled with a liquid crystal L, and the surroundings thereof are sealed with a sealing material 4. The color filter 1 assumes the structure of a black matrix layer 6 formed into a predetermined pattern to shield the boundary portion between the pixels against light, a pixel portion 7 in which a plurality of colors (typically, three primary colors of red (R), green (G), and blue (B)) are arranged in a predetermined order to form each pixel, a protective film 8, and a transparent electrode film 9 are laminated on a transparent substrate 5 in this order from the side near to the transparent substrate.

On the other hand, the TFT array substrate 2 assumes the structure of being TFT elements aligned on a transparent substrate, and a transparent electrode film is disposed (not illustrated). Also, an alignment film 10 is disposed on the inner surface side of the color filter 1 and the TFT array substrate 2 facing thereto. Then, a color image is obtained by controlling the light transmittance of the liquid crystal layer that lies in the background of the pixels colored in each color.

Here, the thickness of the gap portion 3, i.e. the cell gap (the gap distance between the displaying side substrate and the liquid crystal driving side substrate) is no other than the thickness of the liquid crystal layer. Therefore, in order to prevent display mura such as color mura or contrast mura and to impart good display performances such as uniform display, fast responsiveness, high contrast ratio, and wide viewing angle to the color liquid crystal display, one has to maintain the cell gap to be constant and uniform.

As a method of maintaining the cell gap, a method in which numerous spherical or rod-shaped particles 11 made of glass, alumina, plastic, or the like and having a predetermined size are dispersed in the gap portion 3 as spacers; the color filter 1 and the TFT array substrate 2 are bonded; and a liquid crystal is injected is known. With this method, the cell gap is determined and maintained by the size of the spacers.

Figure 4:
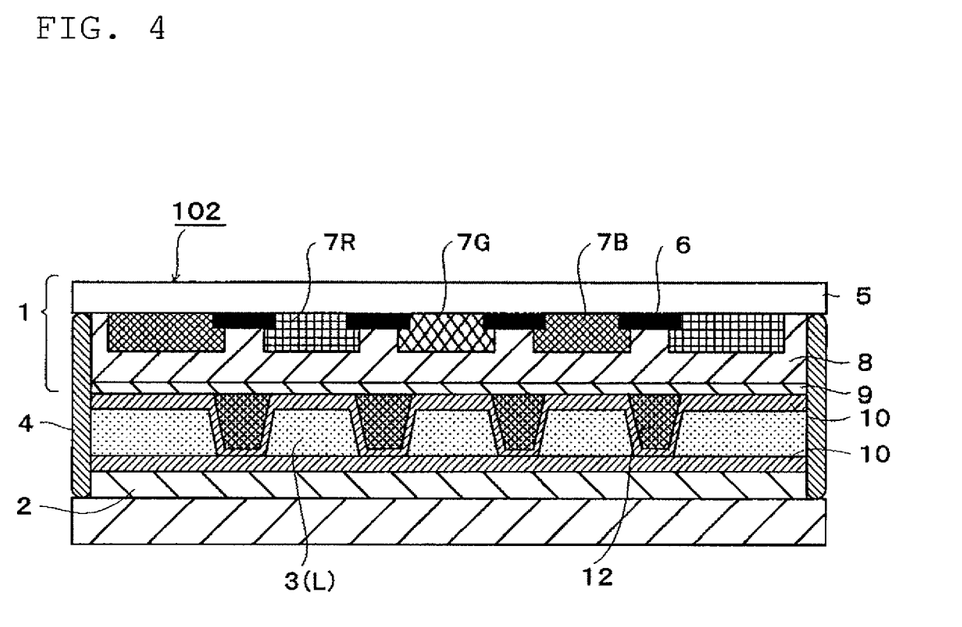
FIG. 4 is a schematic cross-sectional view showing one example of a liquid crystal display of the present invention.

However, the method of dispersing particles in the gap portion as spacers involves various problems such as a tendency of the spacer distribution being deviated. As a method of solving these problems of the particulate spacers, columnar spacers 12 having a height corresponding to the cell gap in a region (non-display region) that is located on the inner surface side of the color filter 1 and overlaps with the position where the black matrix layer 6 is formed are begun to be formed, as illustrated in FIG. 4. The columnar spacers 12 have been formed within the region where the black matrix layer is to be formed, i.e. the non-display region, by applying a photosetting resin in a uniform thickness on a transparent substrate of a color filter and exposing and setting the obtained coating film in a pattern by photolithography.

In recent years, such a liquid crystal display has been rapidly increasing its display area. When the substrate area increases in this way, it will be difficult to adopt a mechanic press method that has been conventionally carried out in curing the sealing material and enclosing the liquid crystal, in view of ensuring the uniformity of the curing of the sealing material, problems of equipment, and the like. Therefore, it is now often carried out by the vacuum press method. However, with the vacuum press method, the load applied onto the cells is extremely small as compared with the mechanic press method, so that the liquid crystal that has been superfluously injected into the cell cannot be squeezed out. Typically, when the cells are assembled by mechanic pressing, they are sealed in a state in which a sufficient load is imposed on the cells, so that the columnar material will not depart from the opposing substrate even if the liquid crystal undergoes thermal expansion due to energization of the backlight or the like. However, when the cells are assembled by the vacuum press method, the load applied onto the cells is weak, so that the opposing substrate will depart from the columnar material when the liquid crystal undergoes thermal expansion. By this, the liquid crystal will be present in deviation in the lower part of the liquid crystal panel, thereby causing display mura called gravity defect.

As a method of solving such a problem, one can conceive a method in which the density of the number of the above-described columnar spacers is reduced so as to keep the substrates parallel even with a weak load such as by the vacuum press method. However, when the density of the number of columnar spacers is reduced, there will be a problem in the uniformity of the panel particularly in the case of a large-size liquid crystal display, so that the method cannot be adopted.

On the other hand, one can conceive a method of reducing the hardness of individual columnar spacers, a method of reducing the size of the columnar spacers themselves, or the like method. However, when such a method is adopted, the amount of plastic deformation will typically be large, thereby raising a problem such as generation of display defect when a local load is applied, for example, in the case of a pressure resistance test such as finger pressing test.

Here, no prior art documents regarding the present invention have been found.

DISCLOSURE OF THE INVENTION

The present invention has been made in view of the above problems, and a principal object thereof is to provide a substrate for a liquid crystal display not undergoing mura called gravity defect because the amount of deformation in a small load region is large and having a uniformity of the panel and an adequate recovery factor against a local load.

In order to achieve the aforementioned object, the present invention provides the substrate for a liquid crystal display comprises at least a transparent substrate and a columnar spacer formed on the transparent substrate. The substrate is characterized in that the amount of initial deformation A of the spacer measured by a following measurement method is 0.04 μm or more and the amount of plastic deformation B is 0.7 μm or less.

When the amount of initial deformation A is a value within the above range, an inconvenience such as the gravity mura described above will be not undergoing even with a comparatively weak load such as in the case of using the vacuum press method. Also, since the amount of plastic deformation B is below or equal to the above value, there is little possibility of undergoing an inconvenience such as display defect even in the case in which a local load is applied, for example, in a finger pressing test.

Measurement method: a compression load is applied in the axial direction of the above columnar spacer up to 80 mN at a load applying speed of 22 mPa/sec and that state is maintained for 5 seconds. Thereafter, the load is removed down to 0 mN at a load removing speed of 22 mPa/sec, and that state is maintained for 5 seconds.

Amount of initial deformation A: amount of compression deformation obtained by X−Y assuming that the initial height of the columnar spacer is X, and the height when the load F (mN) obtained by the following formula (1) is applied during the above load application is Y.

$$F=19.6/n \quad (1)$$

($10 \leq n \leq 50$, n is the density of the number of columnar spacers (pieces/mm$^2$)

Amount of plastic deformation B: amount of residual deformation obtained by X−Z assuming that the initial height of the columnar spacer is X and the height after removing the above load and maintaining that state for 5 seconds is Z.

In the present invention, it is preferable that the following elastic deformation ratio C is 60% or more.

When the elastic deformation ratio is within this range, the shape will sufficiently return to its original shape even when a local load is applied such as in the finger pressing test described above, so that the possibility of raising a problem such as display defect will be further lower.

elastic deformation ratio C: deformation ratio obtained by [(Z−W)/(X−W)]×100 assuming that the initial height of the columnar spacer is X; the height after applying the load of 80 mN and maintaining for 5 seconds is W; and the height after removing the above load and maintaining for 5 seconds is Z.

It is preferable that the present invention is used particularly in a liquid crystal display of 17 inches or more. This is because, in a liquid crystal display having a larger scale, there is a need to adopt particularly the vacuum press method, so that the present invention will be more effective.

Also, the present invention provides a substrate for a liquid crystal display having at least a transparent substrate and a columnar spacer formed on the above transparent substrate and being used in a liquid crystal display of 17 inches or more, the substrate for a liquid crystal display being characterized in that the density of the number of the above columnar spacers is within a range from 15 pieces/mm$^2$ to 50 pieces/mm$^2$.

As described above, in a liquid crystal display of 17 inches or more, one needs to perform pressing by the vacuum press method so as to cure the sealing material and fill with a liquid crystal. However, by the vacuum press method, there is an inconvenience called vacuum mura as described above, so that a columnar spacer that deforms by a predetermined amount is needed even with a comparatively weak load. However, when the columnar spacers are present at a conventional number density (10 pieces/mm$^2$ or less), one needs to hold the load that the individual columnar spacers receive, and also the upper bottom area of the individual columnar spacers cannot be made greatly large, so that it has been difficult to reduce the hardness, and eventually it has been difficult to prevent the vacuum mura. Also, when the vacuum press method is used for a large-scale liquid crystal display such as described above, there will possibly be a problem in the flatness between the columnar spacers if the columnar spacers are present at a conventional number density (10 pieces/mm$^2$ or less), thereby possibly raising a problem in the uniformity of display of the liquid crystal display.

The present invention produces an effect such as being capable of preventing generation of vacuum mura and improving the uniformity of display of the liquid crystal display by setting the density of the number of the columnar spacers to be within a range from 15 pieces/mm$^2$ to 50 pieces/mm$^2$.

The present invention further provides a liquid crystal display characterized by having the above-described substrate for a liquid crystal display. Such a liquid crystal display has advantages such as having a high yield and having a good display quality because an inconvenience such as vacuum mura is hardly underwent at the time of production.

The present invention produces an effect such as being capable of providing a liquid crystal display not undergoing an inconvenience such as gravity mura described above at a comparatively weak load in the case of using the vacuum press method because the amount of initial deformation A is a value of 0.04 μm or more, and an inconvenience such as display defect is less likely to be undergoing even when a local load is applied such as in the case of a finger pressing test because the amount of plastic deformation B is a value of 0.7 μm or less.

BEST MODES FOR CARRYING OUT THE INVENTION

Hereafter, a substrate for a liquid crystal display of the present invention and a liquid crystal display using the same will be described.

A. Substrate for Liquid Crystal Display

The substrate for a liquid crystal display of the present invention includes two modes. Description will be made taking these respectively as the first embodiment and the second embodiment.

1. First Embodiment

The first embodiment of a substrate for a liquid crystal display of the present invention is a substrate for a liquid crystal display having at least a transparent substrate and a columnar spacer formed on the transparent substrate, the substrate for a liquid crystal display being characterized in that the following amount of initial deformation A obtained by measuring the above columnar spacer by the following measurement method is 0.04 μm or more, and the following amount of plastic deformation B is 0.7 μm or less. Further, it is preferable that the following elastic deformation ratio C is 60% or more.

Hereafter, a measurement method used in specifying the embodiment such as present embodiment and the initial deformation amount A, the plastic deformation amount B, and the elastic deformation ratio C obtained by this method will be described in detail.

(Measurement Method)

The measurement method used in this embodiment is carried out on a columnar spacer formed on a transparent substrate. First, a load is applied to the upper bottom surface of the columnar spacer in the axial direction of the columnar spacer at a load applying speed of 22 mPa/sec (a in FIG. 1). This application of the load is carried out up to 80 mN. Subsequently, the state in which the load of 80 mN is applied is maintained for 5 seconds (b in FIG. 1). Thereafter, the load is removed down to 0 mN at a load removing speed of 22 mPa/sec (c in FIG. 1). Then, the state in which the load has been removed (the state of 0 mN) is maintained for 5 seconds (d in FIG. 1).

The displacement amount in the axial direction to the columnar spacer in the state in which the compression load is applied to the columnar spacer by such a method is measured. FIG. 2 shows the data obtained by the measurement of the displacement amount. First, in the state in which the load is being applied at a constant load applying speed (the state of a in FIG. 1), the displacement amount increases as the load increases, as shown by a in FIG. 2. Next, in the state in which the load of 80 mN is being applied is maintained for 5 seconds (the state of b in FIG. 1), the displacement amount is constant or increases a little (b in FIG. 2). Then, in the state in which the load is being removed at a constant load removing speed (the state of c in FIG. 1), the displacement amount decreases as the load is removed, as shown by c in FIG. 2. Then, in the state in which the state with the load of 0 mN is maintained for 5 seconds (the state of d in FIG. 1), the displacement amount gradually decreases (d in FIG. 2).

In the above measurement method, the reason why the maximum load is set to be 80 mN is by making reference to the load in a finger pressing test which is a test of evaluating the display quality when a local load is applied. The maximum load is set to be 80 mN in order to evaluate the display quality when such a local load is applied by measuring the later-described value of the plastic deformation amount B or the elastic deformation amount C.

In the present embodiment, the kind of the sample provided for such measurements is not particularly limited as long as the sample is a columnar spacer formed on a transparent substrate. Specifically, those taken out from a product, those in the middle of production process, those prepared for the measurements, and the like are provided as a sample. Therefore, it may be one in which a columnar spacer is formed, for example, via a black matrix or a protecting layer on a transparent substrate.

The measurements by this measurement method are carried out at room temperature. Here, the room temperature typically refers to 23° C.

As the tester used in the measurements, those that can measure the compression load and the displacement amount with good precision are used. Specifically, one can use a Fischer Scope H-100 manufactured by Fischer Instruments k.k (an indentator having a plane of 100 μm×100 μm by grinding the top portion of a Vickers indentator (having a quadrangular pyramid shape) is used).

(Initial Displacement Amount A)

The initial displacement amount A in this embodiment refers to the amount of compression deformation obtained by X−Y assuming that the initial height of the columnar spacer constituting a sample is X, and the height when the load F (mN) obtained by the following formula (1) is applied during the load application by the above measurement method (the state corresponding to a in FIGS. 1 and 2) is Y.

$$F=19.6/n \quad (1)$$

($10 \leqq n \leqq 50$, n is the density of the number of columnar spacers (pieces/mm$^2$).

First, the above formula (1) will be described. The above formula (1) is obtained by summing up the following formula (2)

$$F(mN)=0.2 \text{ (kgf/cm}^2\text{)} \times 1000 \times 9.8/(n \times 100) \quad (2)$$

Here, the above value of 0.2 kgf/cm$^2$ is a value assumed to be a pressure when the vacuum press method is used. Also, n shows the density of the number of columnar spacers as described above. Therefore, F (mN) value shows a load inferred to be received by individual columnar spacers at the time of vacuum pressing.

Here, although the range of n showing the density of the number of columnar spacers in the above formula is set to be within the range from 10 to 50 pieces/mm$^2$, it is more preferably set to be within the range from 10 to 30 pieces/mm$^2$, particularly within the range from 15 to 30 pieces/mm$^2$.

The initial displacement amount A in this embodiment shows the load represented by this F, i.e. the displacement amount when the load inferred to be received by the individual columnar spacers at the time of vacuum pressing is applied, and shows the displacement amount when approximated to the state at the time of vacuum pressing.

Therefore, when the above initial displacement amount A is large to some extent, the displacement at the time of vacuum pressing is also large, thereby preventing generation of an inconvenience such as vacuum mura.

As described above, this initial displacement amount A is the amount of compression deformation obtained by X−Y assuming that the initial height of the columnar spacer is X, and the height when the load F (mN) obtained by the above formula (1) is applied during the load application by the above testing method (the state of a in FIGS. 1 and 2) is Y. Specifically, the initial displacement amount A is an amount of displacement represented by α in FIG. 2.

In the present embodiment, such initial displacement amount A is preferably 0.04 μm or more, particularly 0.06 μm or more. This is because, when it is within the above range, the possibility of generating an inconvenience such as vacuum mura can be reduced. Here, the upper limit of this initial displacement amount A is not particularly limited as long as the later-mentioned plastic deformation amount B falls within a predetermined range; however, it is typically within the range of 0.2 μm or less.

(Plastic Deformation Amount B)

Next, the plastic deformation amount B will be described. The plastic deformation amount B in this embodiment is the amount of residual deformation obtained by X−Z assuming that the initial height of the columnar spacer is X and the height after removing the above load and maintaining that state for 5 seconds (after the state of d in FIGS. 1 and 2) is Z.

As described above, the maximum load 80 mN in the measurement method used in this embodiment is the load applied in a finger pressing test which is a measurement method for evaluating the display quality when a local load is applied. Therefore, it is inferred that the smaller the residual deformation amount is after this load is removed and it is left to stand for a predetermined period of time after the load is applied for a predetermined period of time, the better display quality will be held against the local load, so that a better result will be obtained in the finger pressing test as well.

Figure 1:
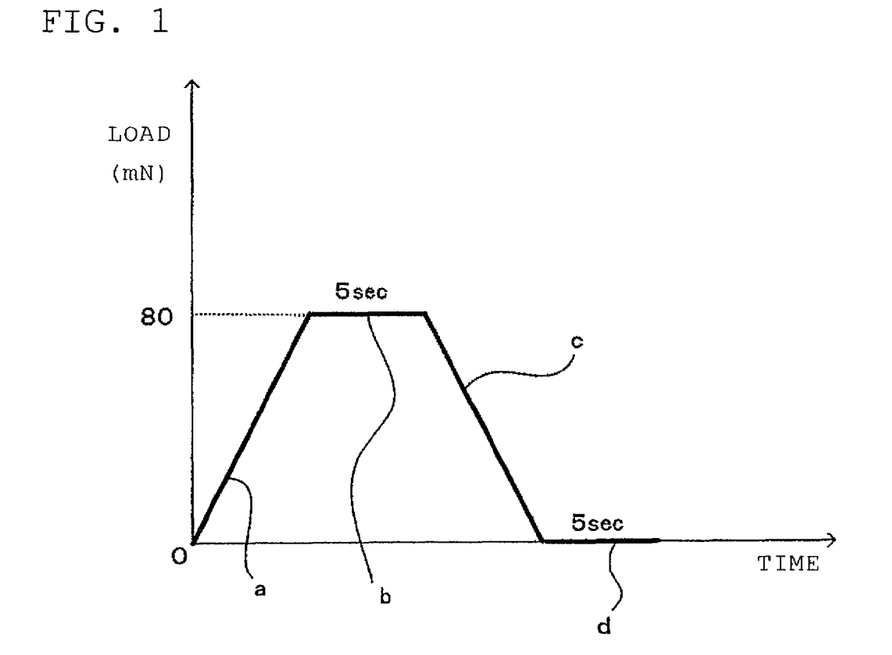
FIG. 1 is a graph showing a relationship between the load and the time in the measurement method used in the present invention.
Figure 2:
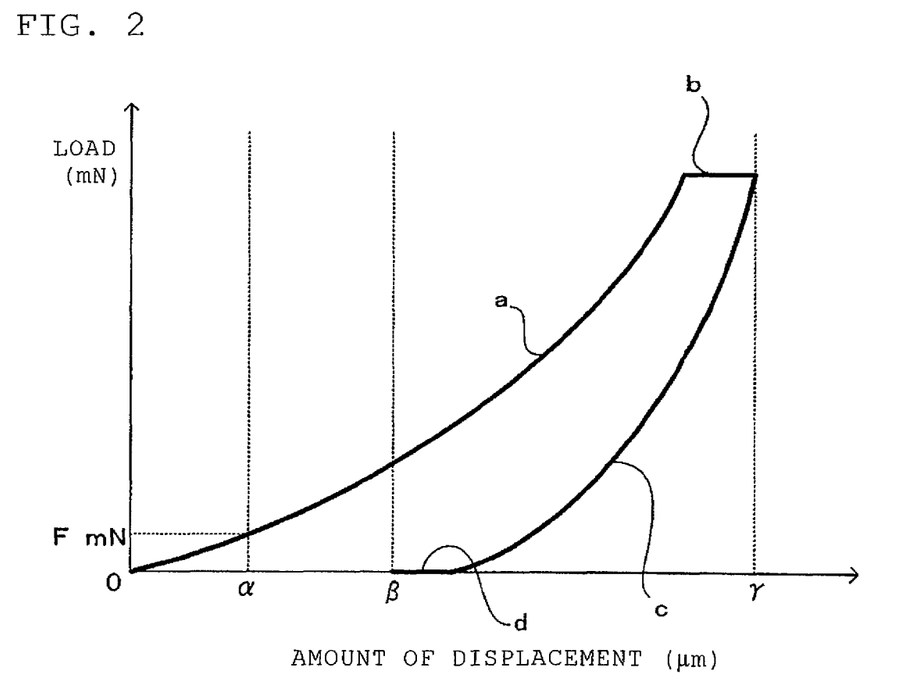
FIG. 2 is a graph showing a relationship between the load and the amount of displacement in the measurement method used in the present invention.

The plastic deformation amount B is an approximation of this state, and shows the residual deformation amount after applying the load of 80 mN which is the maximum load, then removing the load (the state of c in FIGS. 1 and 2), and further maintaining for 5 seconds (the state of d in FIGS. 1 and 2). Specifically, it will be a value shown by $\beta$ in FIG. 2.

In the present embodiment, such plastic deformation amount B is preferably 0.7 μm or less, particularly 0.3 μm or less, more particularly 0.2 μm or less. This is because, when it is within the above range, the return after removal of the load is good even when a local load is applied, thereby providing a good display quality.

(Elastic Deformation Ratio C)

Next, the elastic deformation ratio C will be described. The elastic deformation ratio C is the deformation ratio obtained by $[(Z-W)/(X-W)] \times 100$ assuming that the initial height of the columnar spacer is X; the height after applying the load of 80 mN and maintaining for 5 seconds is W; and the height after removing the above load and maintaining for 5 seconds is Z.

As described above in the description of the plastic deformation amount B, the maximum load 80 mN in the measurement method used in this embodiment is the load applied in a finger pressing test which is a measurement method for evaluating the display quality when a local load is applied. Therefore, it is inferred that the larger the ratio of the returning height after this load is removed and it is left to stand for a predetermined period of time after the load is applied for a predetermined period of time, the better display quality will be held against the local load, so that a better result will be obtained in the finger pressing test as well.

The elastic deformation ratio C in this embodiment is obtained by defining this ratio of the return of the height as an elastic deformation ratio, and shows the ratio of the return of the height after applying the load of 80 mN which is the maximum load, then removing the load (the state of c in FIGS. 1 and 2), and further maintaining for 5 seconds (the state of d in FIGS. 1 and 2). Namely, X−W represents the maximum displacement amount (corresponding to $\gamma$ in FIG. 2) assuming that the height after being held for 5 seconds (the state of b in FIGS. 1 and 2), which is expected to show the maximum compression deformation amount, is W, and the initial height is X. Then, Z−W represents the elastic displacement amount that has returned after removal of the load (corresponding to $\gamma-\beta$ in FIG. 2) assuming that the height after removing the load and maintaining for 5 seconds (the state of d in FIGS. 1 and 2) is Z. The elastic deformation ratio C in this embodiment represents the ratio of the elastic displacement amount relative to the maximum displacement amount, and is a value obtained by $[(Z-W)/(X-W)] \times 100$.

In the present embodiment, such elastic deformation ratio C is preferably 60% or more, particularly 70% or more, more particularly 80% or more. This is because, when it is within the above range, the return after removal of the load is good even when a local load is applied, thereby providing a good display quality.

(Columnar Spacer)

The present embodiment is characterized in that a columnar spacer satisfying a physical property such as described above is formed on a transparent substrate. The material used for such a columnar spacer is not particularly limited; however, the following can be raised as one example thereof.

The columnar spacer satisfying the above physical property can be typically formed by using a photosetting resin composition. As the photosetting resin composition, a composition containing at least a polyfunctional acrylate monomer, a polymer, and a photopolymerization initiator is preferably used.

As the polyfunctional acrylate monomer blended with the photosetting resin composition, a compound having two or more ethylenic unsaturated-bond-containing groups such as an acrylic group or a methacrylic group is used. Specifically, ethylene glycol (meth)acrylate, diethylene glycol di(meth)acrylate, propylene glycol di(meth)acrylate, dipropylene glycol di(meth)acrylate, polyethylene glycol di(meth)acrylate, polypropylene glycol di(meth)acrylate, hexane di(meth)acrylate, neopentyl glycol di(meth)acrylate, glycerin di(meth)acrylate, glycerin tri(meth)acrylate, trimethylolpropane tri(meth)acrylate, 1,4-butanediol diacrylate, pentaerythritol (meth)acrylate, pentaerythritol tri(meth)acrylate, pentaerythritol tetra(meth)acrylate, dipentaerythritol hexa(meth)acrylate, dipentaerythritol penta(meth)acrylate, and others can be raised as examples.

Two or more kinds of the polyfunctional acrylate monomers can be used in combination. Here, in the present embodiment, (meth)acrylic means either of acrylic or methacrylic, and (meth)acrylate means either of an acrylate group or a methacrylate.

In the present embodiment, the content of such polyfunctional acrylate monomers is preferably set to be 50 wt % or more relative to the total solid components of the photosetting resin composition. Here, the total solid components are the sum of all the components other than the solvent, and includes monomer components in a liquid form. When the content of the polyfunctional acrylate monomers in the photosetting resin composition is less than 50 wt %, the elastic deformation ratio of a pattern formed by performing exposure and development with the use of the photosetting resin composition will be small, so that it will be difficult to maintain the above physical property of the columnar spacer in a wide temperature range.

The aforementioned polyfunctional acrylate monomers preferably contain monomers having trifunctional or more ethylenic unsaturated bonds, and the content thereof preferably occupies about 30 to 95 wt % of the amount of the polyfunctional acrylate monomers in use.

When the content of the polyfunctional acrylate monomers in the photosetting resin composition is set to be large, a columnar spacer having the above-described physical property can be formed in a wide temperature range. However, in contrast to this, it will be difficult to obtain a good developability, thereby tending to undergo inconvenience such as falling of the precision of the pattern edge shape or not being able to obtain a forward tapered shape that is preferable for a columnar spacer (i.e. a trapezoid having a ratio of the upper surface area (S2) of the columnar spacer to the lower surface area (S1) being 1 or less). The reason thereof seems to be that, when a large amount of polyfunctional acrylate monomers are blended with a photosetting resin composition, it will contribute in that the elastic deformation will be superior to the plastic deformation because the cross-linking density after setting will be extremely high; however, the solubility at the time of development will fall too much, thereby providing a disadvantage in obtaining a good developability.

In order to solve such an inconvenience, it is preferable to use, among the trifunctional or more of polyfunctional acrylate monomers, those having one or more acidic groups and three or more ethylenic unsaturated bonds in one molecule (hereafter referred to as "trifunctional or more acidic polyfunctional acrylate monomers").

The trifunctional or more acidic polyfunctional acrylate monomers have a function of improving the cross-linking density of the resin composition and a function of improving the alkali developability. For this reason, in the case of forming a columnar spacer with the use of a resin composition containing the acidic polyfunctional acrylate monomers, the edge shape of the columnar spacer will be good, and it will be easy to form a good forward tapered shape having a ratio (S2/S1) of the upper surface area (S2) of the columnar spacer to the lower surface area (S1) being 1 or less and 0.3 or more. Further, the elastic deformation ratio at room temperature will be good, and in particular, one can form a columnar spacer having a sufficient hardness to be less liable to undergo plastic deformation and having a flexibility to follow the thermal contraction and expansion of the liquid crystal at the time of press-bonding the cells of the above liquid crystal panel and subsequent handling.

The acidic groups of the acidic polyfunctional acrylate monomers may be those capable of being subjected to alkali development and, for example, carboxyl group, sulfonic acid group, and phosphoric acid group can be raised as examples. However, a carboxyl group is preferable in view of the alkali developability and the handling of the resin composition.

As the trifunctional or more acidic polyfunctional acrylate monomers such as described above, one can use (1) polyfunctional (meth)acrylate having a carboxyl group introduced by denaturing hydroxyl-group-containing polyfunctional (meth)acrylate with a dibasic acid anhydride or (2) polyfunctional (meth)acrylate having a sulfonic acid group introduced by denaturing aromatic polyfunctional (meth)acrylate with concentrated sulfuric acid or fuming sulfuric acid, or the like.

As the trifunctional or more acidic polyfunctional acrylate monomers, those represented by the following general formulae (1) and (2) are preferable.

(1)

(2)

(In the formula (1), each n is 0 to 14, and each m is 1 to 8. In the formula (2), Rs are similar to that of formula (1); each n is 0 to 14; p is 1 to 8; and q is 1 to 8. Plural Rs, Ts, and Gs that are present in one molecule may be individually the same or different.)

Specifically, as the acidic polyfunctional acrylate monomers represented by the formulae (1) and (2), TO-756 which is a carboxyl-group-containing trifunctional acrylate and TO-1382 which is a carboxyl-group-containing pentafunctional acrylate manufactured by TOA GOSEI CO., LTD. can be raised as examples.

As the polymers to be blended with the photosetting resin composition, one can raise ethylene-vinyl acetate copolymer, ethylene-vinyl chloride copolymer, ethylene-vinyl copolymer, polystyrene, acrylonitrile-styrene copolymer, ABS resin, polymethacrylic acid resin, ethylene-methacrylic acid resin, polyvinyl chloride resin, chlorinated vinyl chloride, polyvinyl alcohol, cellulose acetate propionate, cellulose acetate butyrate, nylon 6, nylon 66, nylon 12, polyethylene terephthalate, polybutyrene terephthalate, polycarbonate, polyvinyl acetal, polyether ether ketone, polyether sulfone, polyphenylene sulfide, polyalylate, polyvinyl butyral, epoxy resin, phenoxy resin, polyimide resin, polyamideimide resin, polyamic acid resin, polyetherimide resin, phenolic resin, urea resin, and the like as examples.

Further, as the polymer, a polymer or a copolymer made of one or more kinds selected from methyl(meth)acrylate, ethyl (meth)acrylate, n-propyl(meth)acrylate, isopropyl(meth) acrylate, sec-butyl(meth)acrylate, isobutyl(meth)acrylate, tert-butyl(meth)acrylate, n-pentyl(meth)acrylate, n-hexyl (meth)acrylate, 2-ethylhexyl(meth)acrylate, n-octyl(meth) acrylate, n-decyl(meth)acrylate, styrene, α-methylstyrene, N-vinyl-2-pyrrolidone, and glycidyl (meth)acrylate, which are polymerizable monomers, and one or more kinds selected from (meth)acrylic acid, dimer of acrylic acid (for example, M-5600 manufactured by TOA GOSEI CO., LTD.), itaconic acid, crotonic acid, maleic acid, fumaric acid, vinylacetic acid, and anhydrides of these, can be raised as an example. Also, a polymer or the like obtained by adding an ethylenic unsaturated compound having a glycidyl group or a hydroxyl group to the above copolymer can be raised as an example. However, the polymer is not limited to these alone.

Among the above-exemplified polymers, polymers containing an ethylenic unsaturated bond are especially preferably used because of forming a cross-linking bond together with the monomers to give an excellent strength.

The content of such a polymer is preferably 10 to 40 wt % relative to the total solid components of the photosetting resin composition.

As the photopolymerization initiator to be blended with the photosetting resin composition, one can use a photoradical polymerization initiator that can be activated with ultraviolet ray, ionizing radiation, visible light, or energy rays of other wavelengths, particularly of 365 nm or less. Specifically, as such a photopolymerization initiator, a combination of a photoreducing pigment such as benzophenone, methyl o-benzoylbenzoate, 4,4-bis(dimethylamine)benzophenone, 4,4-bis (diethylamine)benzophenone, α-aminoacetophenone, 4,4-dichlorobenzophenone, 4-benzoyl-4-methyl diphenyl ketone, dibenzyl ketone, fluorenone, 2,2-diethoxyacetophenone, 2,2-dimethoxy-2-phenylacetophenone, 2-hydroxy-2-methylpropiophenone, p-tert-butyldichloroacetophenone, thioxanthone, 2-methylthioxanthone, 2-chlorothioxanthone, 2-isopropylthioxanthone, diethylthioxanthone, benzyldimethylketal, benzylmethoxyethylacetal, benzoin methyl ether, benzoin butyl ether, anthraquinone, 2-tert-butylanthraquinone, 2-amylanthraquinone, β-chloroanthraquinone, anthrone, benzanthrone, methyleneanthrone, 4-azidobenzylacetophenone, 2,6-bis(p-azidobenzylidene)cyclohexane, 2,6-bis(p-azidobenzylidene)-4-methylcyclohexanone, 2-phenyl-1,2-butadione-2-(o-methoxycarbonyl)oxime, 1-phenyl-propanedione-2-(o-ethoxycarbonyl)oxime, 1,3-diphenyl-propanetrione-2-(o-ethoxycarbonyl)oxime, 1-phenyl-3-ethoxy-propanetrione-2-(o-benzoyl)oxime, micher's ketone, 2-methyl-1[4-(methylthio)phenyl]-2-morpholinopropane-1-one, 2-benzyl-2-dimethylamino-1-(4-morpholinophenyl)-butanone, naphthalenesulfonyl chloride, quinolinesulfonyl chloride, n-phenylthioacridone, 4,4-azobisisobutyronitrile, diphenyl disulfide, benzthiazole disulfide, triphenylphosphine, camphorquinone, N1717 manufactured by Asahi Denka Co., Ltd., carbon tetrabromide, tribromophenylsulfone, benzoin peroxide, eosine, or Methylene Blue with a reducing agent such as ascorbic acid or triethanolamine, or the like can be raised as an example. In this embodiment, a single kind or a combination of two or more kinds of these photopolymerization initiators can be used.

The content of such a photopolymerization initiator is preferably 2 to 20 wt % relative to the total solid components of the photosetting resin composition.

The photosetting resin composition may contain components other than polyfunctional acrylate monomers, polymers, and a photopolymerization initiator in accordance with the needs. For example, an epoxy resin may be blended with the photosetting resin composition for the purpose of improving the heat resistance, close adhesiveness, and chemical resistance (particularly alkali resistance). As the epoxy resin that can be used, one can raise the trade name Epikote Series manufactured by Japan Epoxy Resins Co., Ltd., the trade name Celloxide Series manufactured by DAICEL CHEMICAL INDUSTRIES, LTD., and the trade name Epolead Series manufactured by the same company as examples. As the epoxy resin, one can raise bisphenol-A type epoxy resin, bisphenol-F type epoxy resin, bisphenol-S type epoxy resin, novolak type epoxy resin, polycarboxylicacidglycidyl ester, polyol glycidyl ester, aliphatic or alicyclic epoxy resin, amine epoxy resin, triphenolmethane type epoxy resin, dihydroxybenzene type epoxy resin, a copolymerization epoxy compound of glycidyl (meth)acrylate and a radical-polymerizable monomer, and the like as examples. In the present embodiment, a single kind or a combination of two or more kinds of these epoxy resins can be used.

The content of such an epoxy resin is preferably 0 to 10 wt % relative to the total solid components of the photosetting resin composition.

Typically, a solvent is blended with the photosetting resin composition in order to dissolve and disperse the solid components and adjust the application suitableness for spin coating or the like. As the solvent, it is preferable to use a solvent having a good dissolving property or dispersing property to the blended components such as monomers, polymers, and a photopolymerization initiator and having a comparatively high boiling point so as to attain a good spin coating property. With the use of these solvents, the solid component concentration is typically adjusted to be 5 to 50 wt %.

For preparation of a curable resin composition, polyfunctional acrylate monomers, polymers, a photopolymerization initiator, and other components in accordance with the needs may be put into a suitable solvent, and may be dissolved and dispersed by a general method such as a paint shaker, a beads mill, a sand grind mill, a ball mill, an attritor mill, a two-roll mill, or a three-roll mill.

The method of producing a columnar spacer in this embodiment is not particularly limited, and the columnar spacer is produced by a production method generally used in this field of the art, specifically, by a method of producing it by applying the above composition with a spin coater, patterning by the photolithography method, and curing, or the like.

(Transparent Substrate)

The transparent substrate to be used in the present invention is not particularly limited as long as it is used for a liquid crystal display. A non-flexible transparent rigid material such as quartz glass, Pyrex (registered trademark) glass, or synthetic quartz plate or a transparent flexible material having a flexibility such as a transparent resin film or an optical resin plate can be used.

(Substrate for Liquid Crystal Display)

The substrate for a liquid crystal display of the present embodiment is one in which a columnar spacer satisfying the physical property such as described above is formed on the above transparent substrate.

In the present embodiment, the columnar spacers satisfying the above-described physical property are arranged at least at a ratio of 75% or more, particularly 85% or more, more particularly 90% or more, in the total number of the columnar spacers formed on the transparent substrate. This is because, when they are arranged within the above range, the effect of the present invention can be exhibited more effectively;

In the present embodiment, such a columnar spacer may be formed either on the display side substrate or on the liquid crystal driving side substrate. Also, the substrate for a liquid crystal display of the present embodiment is not particularly limited; however, it is preferably a substrate for a color liquid crystal display that is used in a color liquid crystal display.

Also, in the present embodiment, it is preferably a substrate for a liquid crystal display that is used in a liquid crystal display in which particularly the size of the liquid crystal display is 17 inches or more. This is because, in the size of 17 inches or more, the vacuum press method is used, so that the advantages of the present embodiment can be most utilized particularly in a substrate for a liquid crystal display that is used in a liquid crystal display of 17 inches or more.

In the substrate for a liquid crystal display of the present embodiment, various functional layers that are needed may be formed in addition to the transparent substrate and the columnar spacers. These functional layers are formed by being suitably selected in accordance with the kind of the substrate on which the columnar spacers are formed. Also, various functional layers may be formed on a transparent substrate and the columnar spacers may be formed thereon, or the functional layers may be formed on the columnar spacers.

2. Second Embodiment

Next, the second embodiment of the substrate for a liquid crystal display of the present invention will be described. The substrate for a liquid crystal display of the present embodiment is a substrate for a liquid crystal display having a transparent substrate and a columnar spacer formed on the above transparent substrate and being used in a liquid crystal display of 17 inches or more, characterized in that the density of the number of the above columnar spacers is within a range from 15 pieces/mm$^2$ to 50 pieces/mm$^2$.

As described above, in a large-size liquid crystal display of 17 inches or more, one needs to perform pressing by the vacuum press method so as to cure the sealing material and fill with a liquid crystal. However, by the vacuum press method, there is an inconvenience called vacuum mura as described above, so that a columnar spacer that deforms by a predetermined amount is needed even with a comparatively weak load. However, when the columnar spacers are present at a conventional number density (10 pieces/mm$^2$ or less), one needs to hold the load that the individual columnar spacers receive, and also the upper bottom area of the individual columnar spacers cannot be made greatly large, so that it has been difficult to reduce the hardness. Consequently, it has been difficult to prevent the vacuum mura.

Also, when the vacuum press method is used for a large-scale liquid crystal display such as described above, there will possibly be a problem in the flatness between the columnar spacers if the columnar spacers are present at a conventional number density (10 pieces/mm$^2$ or less), thereby possibly raising a problem in the uniformity of display of the liquid crystal display.

In view of this, the present embodiment solves the aforementioned problems by raising the density of the number of columnar spacers as compared with a conventional one.

In the present embodiment, the density of the number of columnar spacers is set to be within a range from 15 pieces/mm$^2$ to 50 pieces/mm$^2$, in particular, preferably set to be within a range from 15 pieces/mm$^2$ to 30 pieces/mm$^2$, more preferably within a range from 15 pieces/mm$^2$ to 20 pieces/mm$^2$. This is because, if the density of the number of columnar spacers is within the above range, the vacuum mura can be prevented, and further the uniformity of display of the liquid crystal display can be improved.

In the substrate for a liquid crystal display of the present embodiment, the upper bottom area of the columnar spacer is preferably within a range from 20 μm$^2$ to 320 μm$^2$, particularly within a range from 30 μm$^2$ to 150 μm$^2$, more particularly within a range from 30 μm$^2$ to 100 μm$^2$. This is because, by setting the density of the number of columnar spacers to be within the above range and by setting the upper bottom area of the columnar spacer to be within the above range, the vacuum mura can be easily prevented, and the display quality of the liquid crystal display can be easily improved.

As the physical property of the columnar spacer used in the present embodiment, it preferably has the physical property that is defined in the above first embodiment. This is because, by this, the possibility of generating an inconvenience such as display defect can be reduced even when a local load is applied in a finger pressing test or other tests.

Other than that, the material that can be used in a columnar spacer, the transparent substrate, and other preferable embodiments as the substrate for a liquid crystal display are similar to those described in the first embodiment, so that the description will be omitted here.

B. Liquid Crystal Display

Next, the liquid crystal display of the present invention will be described. The liquid crystal display of the present invention is characterized in that the substrate for a liquid crystal display shown in the above first and second embodiments is used. Therefore, the advantages that these substrates for a liquid crystal display have can be produced. Namely, a liquid crystal display can be made not undergoing an inconvenience such as the above-described gravity mura even when it is produced by using the vacuum press method that is used in producing a liquid crystal display having a comparatively large size, and further an inconvenience such as undergoing display defect even when a local load is applied in a finger pressing test or other tests can be made less.

The other features of the liquid crystal display of the present invention are not particularly limited as long as a substrate for a liquid crystal display such as described above is used. The other features are similar to those of ordinary liquid crystal displays, so that the description will be omitted here.

In the present invention, the liquid crystal display is preferably a color liquid crystal display. As for the kind of the liquid crystal display, those of an STN (Super-Twisted Nematic) mode, a TN (Twisted Nematic) mode, an IPS (In-Plane Switching) mode, a VA (Vertically Aligned) mode, and others can be raised as examples, however the kind is not particularly limited.

The present invention is not limited to the above-described embodiments. The above embodiments are exemplary, so that any of those having a construction substantially identical to the technical idea described in the claims of the present invention and exhibiting similar functions and effects will be comprised within the technical scope of the present invention.

EXAMPLES

Hereafter, Examples will be shown to describe the present invention in further detail.

(Preparation of Curable Resin Composition)

(1) Synthesis of Copolymerized Resin Solution

A polymerization tank was loaded with 63 parts by weight of methyl methacrylate (MMA), 12 parts by weight of acrylic acid (AA), 6 parts by weight of 2-hydroxyethyl methacrylate (HEMA), and 88 parts by weight of diethylene glycol dimethyl ether (DMDG). After agitation for dissolution, 7 parts by weight of 2,2'-azobis(2-methylbutyronitrile) was added and uniformly dissolved. Thereafter, the solution was agitated at 85° C. for 2 hours in a nitrogen stream, and further reacted at 100° C. for one hour. Further, 7 parts by weight of glycidyl methacrylate (GMA), 0.4 part by weight of triethylamine, and 0.2 part by weight of hydroquinone were added to the obtained solution. Agitation at 100° C. for 5 hours gave an intended copolymerized resin solution 1 (solid components 50%). The physical property of the obtained copolymer is shown in Table 1.

TABLE 1

| | Copolymer composition (wt %) | | | | Acid value (MgKOH/g) | Mw (×10⁴) | Concentration (%) |
|---|---|---|---|---|---|---|---|
| | MMA | AA | HEMA | GMA | | | |
| Copolymerized resin solution 1 | 71 | 14 | 7 | 8 | 108 | 2.5 | 50 |

(2) Preparation of Curable Resin Composition 1

Materials in the following amounts:

The above copolymerized resin solution 1 (solid components 50%): 16 parts by weight Dipentaerythritol pentaacrylate (Sartomer Company Inc, SR399): 24 parts by weight Orthocresol novolak type epoxy resin (manufactured by Japan Epoxy Resins Co., Ltd., Epikote 180S70): 4 parts by weight 2-methyl-1-(4-methylthiophenyl)-2-morpholinopropane-1-one: 4 parts by weight Diethylene glycol dimethyl ether: 52 parts by weight were agitated and mixed at room temperature to obtain a curable resin composition 1.

(3) Preparation of Curable Resin Composition 2

Materials in the following amounts:

The above copolymerized resin solution 1 (solid components 50%): 32 parts by weight Dipentaerythritol pentaacrylate (Sartomer Company Inc, SR399): 16 parts by weight Orthocresol novolak type epoxy resin (manufactured by Japan Epoxy Resins Co., Ltd., Epikote 180S70): 4 parts by weight 2-methyl-1-(4-methylthiophenyl)-2-morpholinopropane-1-one: 4 parts by weight Diethylene glycol dimethyl ether: 44 parts by weight were agitated and mixed at room temperature to obtain a curable resin composition 2.

(Fabrication of Color Filter)

(1) Forming of Black Matrix

First, components in the following amounts:

Black pigment: 23 parts

Polymer dispersant (Disperbyk 111 manufactured by BYK-Chemie Japan KK): 2 parts by weight Solvent (diethylene glycol dimethyl ether): 75 parts by weight were mixed and sufficiently dispersed with a sand mill to prepare a black pigment dispersion.

Next, components in the following amounts:

The above black pigment dispersion: 61 parts by weight

The curable resin composition 1: 20 parts by weight

Diethylene glycol dimethyl ether: 30 parts by weight were sufficiently mixed to obtain a composition for a light-shielding layer.

Then, the above composition for a light-shielding layer was applied with a spin coater on a glass substrate having a thickness of 1.1 mm (AL material manufactured by ASAHI GLASS CO., LTD.), followed by drying at 100° C. for 3 minutes to form a light-shielding layer having a film thickness of about 1 µm. After the light-shielding layer was exposed into a light-shielding pattern with an ultrahigh pressure mercury lamp, the light-shielding layer was developed with a 0.05% aqueous solution of potassium hydroxide, followed by performing a heat treatment by leaving the substrate to stand for 30 minutes in an atmosphere of 180° C. so as to form a black matrix in a region where a light-shielding portion is to be formed.

(2) Forming of Colored Layer

On the substrate on which the black matrix had been formed as described above, a red curable resin composition having the following composition was applied (with an application thickness of 1.5 µm) by the spin coating method, followed by drying in an oven of 70° C. for 30 minutes.

Subsequently, a photomask was placed at a distance of 100 µm from the coating film of the red curable resin composition, and ultraviolet rays were radiated for 10 seconds only on a region corresponding to the colored layer forming region with the use of an ultrahigh pressure mercury lamp of 2.0 kW with a proximity aligner. Subsequently, the substrate was immersed into a 0.05 wt % aqueous solution of potassium hydroxide (liquid temperature of 23° C.) for one minute to perform alkali development, so as to remove only the uncured part of the coating film of the red curable resin composition. Thereafter, the substrate was left to stand in an atmosphere of 180° C. for 30 minutes to perform a heat treatment, so as to form a red relief pattern in a region where red pixels are to be formed.

Next, with the use of a green curable resin composition having the following composition, a green relief pattern was formed in a region where green pixels are to be formed, by the steps similar to those of forming the red relief pattern.

Further, with the use of a blue curable resin composition having the following composition, a blue relief pattern was formed in a region where blue pixels are to be formed, by the steps similar to those of forming the red relief pattern, thereby forming a colored layer made of three colors of red (R), green (G), and blue (B).

a. Composition of Red Curable Resin Composition

C. I. Pigment Red 177: 10 parts by weight

Polysulfonic acid type polymer dispersant: 3 parts by weight

The curable resin composition 1: 5 parts by weight 3-methoxybutyl acetate: 82 parts by weight b. Composition of Green Curable Resin Composition C. I. Pigment Green 36: 10 parts by weight Polysulfonic acid type polymer dispersant: 3 parts by weight The curable resin composition 1: 5 parts by weight 3-methoxybutyl acetate: 82 parts by weight c. Composition of Blue Curable Resin Composition C. I. Pigment Blue 15: 6:10 parts by weight Polysulfonic acid type polymer dispersant: 3 parts by weight The curable resin composition 1: 5 parts by weight 3-methoxybutyl acetate: 82 parts by weight (3) Forming of Protective Film On the substrate on which the colored layer had been formed as described above, the curable resin composition 1 was applied by the spin coating method and dried to form a coating film having a dry thickness of 2 μm.

A photomask was placed at a distance of 100 μm from the coating film of the curable resin composition 1, and ultraviolet rays were radiated for 10 seconds only on a region corresponding to the colored layer forming region with the use of an ultrahigh pressure mercury lamp of 2.0 kW with a proximity aligner. Subsequently, the substrate was immersed into a 0.05 wt % aqueous solution of potassium hydroxide (liquid temperature of 23° C.) for one minute to perform alkali development, so as to remove only the uncured part of the coating film of the curable resin composition. Thereafter, the substrate was left to stand in an atmosphere of 200° C. for 30 minutes to perform a heat treatment, so as to form a protective film, thereby obtaining the color filter of the present invention.

(4) Forming of Spacers

On the substrate on which the colored layer had been formed as described above, the curable resin compositions 1 and 2 were applied by the spin coating method and dried to form a coating film.

A photomask was placed at a distance of 100 μm from the coating film of the curable resin composition 1, and ultraviolet rays were radiated for 10 seconds only on a spacer forming region on the black matrix with the use of an ultrahigh pressure mercury lamp of 2.0 kW with a proximity aligner. Subsequently, the substrate was immersed into a 0.05 wt % aqueous solution of potassium hydroxide (liquid temperature of 23° C.) for one minute to perform alkali development, so as to remove only the uncured part of the coating film of the curable resin composition. Thereafter, the substrate was left to stand in an atmosphere of 200° C. for 30 minutes to perform a heat treatment, so as to form fixed spacers having a height, an upper bottom area, and a number density shown in the following Tables 2 and 3 on the color filter.

(Fabrication of Liquid Crystal Display)

On the surface including the fixed spacers of the color filter obtained as described above, a transparent electrode film was formed using ITO as a target by the DC magnetron sputtering method at a substrate temperature of 200° C. and using argon and oxygen as an electric discharge gas. Thereafter, an alignment film made of polyimide was further formed on the transparent electrode film.

Subsequently, a necessary amount of TN liquid crystal was dropped onto a glass substrate on which TFTs had been formed, and the above color filter was superposed. Using an UV curable resin as a sealing material, exposure was carried out at a radiation amount of 400 mJ/cm2 while applying a pressure of 0.2 kgf/cm2 at room temperature so as to join for cell assemblage, thereby fabricating the liquid crystal display of the present invention.

(Liquid Crystal Display Evaluation)

Evaluation of the liquid crystal display fabricated by the above method was carried out by the following method. The evaluation results of the Examples are shown in the following Table 2, and the evaluation results of the Comparative Examples are shown in the following Table 3.

(1) Local Pressure Resistance Evaluation

A metal rod having a diameter of 10 mmϕ was mounted on the fabricated liquid crystal display, and a load of 5 kgf was applied thereon for 15 minutes. Display mura was evaluated by eye inspection when 5 minutes passed after the metal rod was removed.

(2) Gravity Defect Evaluation

Display mura was evaluated by eye inspection after the fabricated liquid crystal display was heated (energized) for hours with back light.

(3) Uniformity Evaluation

Color mura of the fabricated liquid crystal display was evaluated by macroscopic evaluation.

TABLE 2

| Sensitive Material | CS Height μm | Upper Bottom Area μm2 | F mN | Density Pieces/mm² | Displacement (F) μm | 80 mN Load Test | | Local Pressure Resistance Test | Gravity Defect | Uniformity |
|---|---|---|---|---|---|---|---|---|---|---|
| | | | | | | Elastic Change Ratio % | Plastic Deformation μm | | | |
| Curable Resin Composition 1 | 3.5 | 130 | 1.31 | 15 | 0.041 | 91.2 | 0.045 | ○ | ○ | ○ |
| Curable Resin Composition 1 | 3.6 | 35 | 1.09 | 18 | 0.062 | 87.8 | 0.106 | ○ | ○ | ○ |
| Curable Resin Composition 1 | 4.0 | 100 | 1.31 | 15 | 0.046 | 80.4 | 0.167 | ○ | ○ | ○ |
| Curable Resin Composition 1 | 4.5 | 50 | 0.44 | 45 | 0.041 | 86.1 | 0.145 | ○ | ○ | ○ |
| Curable Resin Composition 1 | 4.7 | 75 | 0.65 | 30 | 0.041 | 61.2 | 0.508 | ○ | ○ | ○ |
| Curable Resin Composition 1 | 5.0 | 130 | 0.98 | 20 | 0.044 | 75.6 | 0.245 | ○ | ○ | ○ |

TABLE 3

| Sensitive Material | CS height μm | Upper bottom area μm2 | F mN | Density Pieces/mm² | Displacement (F) μm | 80 mN Load test | | Local pressure resistance test | Gravity defect | Uniformity |
|---|---|---|---|---|---|---|---|---|---|---|
| | | | | | | Elastic change ratio % | Plastic deformation μm | | | |
| Curable resin composition 2 | 3.6 | 130 | 2.80 | 7 | 0.054 | 90.3 | 0.060 | ○ | ○ | x |
| Curable resin composition 1 | 4.5 | 130 | 0.98 | 20 | 0.037 | 82.4 | 0.148 | ○ | x | ○ |

TABLE 3-continued

| | Upper | | | | | 80 mN Load test | | Local | | |
|---|---|---|---|---|---|---|---|---|---|---|
| Sensitive Material | CS height μm | bottom area μm² | F mN | Density Pieces/mm² | Displacement (F) μm | Elastic change ratio % | Plastic deformation μm | pressure resistance test | Gravity defect | Uniformity |
| Curable resin composition 2 | 5.5 | 100 | 1.96 | 10 | 0.100 | 55.6 | 0.663 | x | ○ | ○ |
| Curable resin composition 2 | 5.0 | 70 | 0.78 | 25 | 0.055 | 61.2 | 0.716 | x | ○ | x |

We claim:

1. A method for manufacturing a liquid crystal display comprising the steps of:
    preparing a substrate for a liquid crystal display, which comprises at least a transparent substrate and a number of columnar spacers formed on the transparent substrate, and an opposing substrate, which comprises at least a transparent substrate; and
    curing a sealing material and filling a liquid crystal by a vacuum press method after providing the substrate for a liquid crystal display and the opposing substrate to face each other with the liquid crystal and the sealing material for sealing the liquid crystal placed in between, wherein
    the liquid crystal display to be manufactured is of 17 inches or more; and
    a density of the number of the columnar spacers is within a range from 15 pieces/mm² to 20 pieces/mm².

2. The method for manufacturing a liquid crystal display according to claim 1, wherein an upper surface area of the columnar spacer is within a range from 30 μm² to 100 μm².

3. The method for manufacturing a liquid crystal display according to claim 1, wherein the substrate for a liquid crystal display is a following amount of an initial deformation A obtained by measuring the columnar spacer by a following measurement method is 0.04 μm or more, and a following amount of a plastic deformation B is 0.7 μm or less:
    measurement method: a compression load is applied in an axial direction of the columnar spacer up to 80 mN at a load applying speed of 22 mPa/sec and that state is maintained for 5 seconds; thereafter, the load is removed down to 0 mN at a load removing speed of 22 mPa/sec, and that state is maintained for 5 seconds,
    amount of initial deformation A: an amount of a compression deformation obtained by X−Y assuming that an initial height of the columnar spacer is X, and a height when a load F (mN) obtained by a following formula (1) is applied during an above load application is Y:

$$F=19.6/n$$

($10 \leqq n \leqq 50$, n is a density of a number of columnar spacers (pieces/mm²)),
    amount of plastic deformation B: an amount of a residual deformation obtained by X−Z assuming that the initial height of the columnar spacer is X and a height after removing the load and maintaining that state for 5 seconds is Z.

4. The method for manufacturing a liquid crystal display according to claim 2, wherein the substrate for a liquid crystal display is a following amount of an initial deformation A obtained by measuring the columnar spacer by a following measurement method of 0.04 μm or more, and a following amount of plastic deformation B is 0.7 μm or less:
    measurement method: a compression load is applied in an axial direction of the columnar spacer up to 80 mN at a load applying speed of 22 mPa/sec and that state is maintained for 5 seconds; thereafter, the load is removed down to 0 mN at a load removing speed of 22 mPa/sec, and that state is maintained for 5 seconds,
    amount of initial deformation A: an amount of a compression deformation obtained by X−Y assuming that an initial height of the columnar spacer is X, and a height when a load F (mN) obtained by a following formula (1) is applied during an above load application is Y:

$$F=19.6/n$$

($10 \leqq n \leqq 50$, n is a density of a number of columnar spacers (pieces/mm²)),
    amount of plastic deformation B: an amount of a residual deformation obtained by X−Z assuming that the initial height of the columnar spacer is X an a height after removing the load and maintaining that state for 5 seconds is Z.

5. The method for manufacturing a liquid crystal display according to claim 1, wherein a following elastic deformation ratio C is 60% or more:
    elastic deformation ratio C: a deformation ratio obtained by $[(Z-W)/(X-W)]\times 100$ assuming that an initial height of the columnar spacer is X; a height after applying a load of 80 mN and maintaining for 5 seconds is W; and a height after removing the load and maintaining for 5 seconds is Z.

6. The method for manufacturing a liquid crystal display according to claim 2, wherein a following elastic deformation ratio C is 60% or more:
    elastic deformation ratio C: a deformation ratio obtained by $[(Z-W)/(X-W)]\times 100$ assuming that an initial height of the columnar spacer is X; a height after applying a load of 80 mN and maintaining for 5 seconds is W; and a height after removing the load and maintaining for 5 seconds is Z.

7. The method for manufacturing a liquid crystal display according to claim 3, wherein a following elastic deformation ratio C is 60% or more:
    elastic deformation ratio C: a deformation ratio obtained by $[(Z-W)/(X-W)]\times 100$ assuming that the initial height of the columnar spacer is X; a height after applying a load of 80 mN and maintaining for 5 seconds is W; and a height after removing the load and maintaining for 5 seconds is Z.

8. The method for manufacturing a liquid crystal display according to claim 4, wherein a following elastic deformation ratio C is 60% or more:
    elastic deformation ratio C: a deformation ratio obtained by $[(Z-W)/(X-W)]\times 100$ assuming that an initial height of the columnar spacer is X; a height after applying a load of 80 mN and maintaining for 5 seconds is W; and a height after removing the load and maintaining for 5 seconds is Z.

* * * * *